United States Patent [19]

Koski et al.

[11] 3,827,251

[45] Aug. 6, 1974

[54] APPARATUS FOR COOLING A LIVING ORGAN

[76] Inventors: William L. Koski, 3905 Halifax Ave., Minneapolis, Minn. 55422; Emil S. Swenson, 10500 Dogwood Rd. N.W., Coon Rapids, Minn. 55433

[22] Filed: July 2, 1973

[21] Appl. No.: 375,925

[52] U.S. Cl. .................. 62/217, 62/514, 128/1 R
[51] Int. Cl. .............................................. F25b 41/04
[58] Field of Search ...... 128/1 R; 62/157, 209, 217, 62/514, 78

[56] References Cited
UNITED STATES PATENTS

| | | | |
|---|---|---|---|
| 3,545,221 | 12/1970 | Swenson et al. | 62/78 |
| 3,545,225 | 12/1970 | Swenson et al. | 62/78 |
| 3,667,246 | 6/1972 | St. Lorant et al. | 62/514 |

Primary Examiner—Meyer Perlin
Assistant Examiner—Ronald C. Capossela
Attorney, Agent, or Firm—Williamson, Bains & Moore

[57] ABSTRACT

An organ cooling apparatus includes a receptacle which contains a liquid bath and which has a refrigerant coil therein. A regrigerant, such as liquid nitrogen is passed through the coil to cool the liquid bath within the receptacle. The organ to be cooled is placed in the bath and a control device including a mechanical program mechanism is preset to cool the organ at a constant rate in a predetermined cooling cycle. Both the theoretical and the true temperatures of the organ are constantly monitored and indicated on a calibrated temperature scale and when the true temperature of the organ is less than the theoretical temperature a valve connected in flow controlling relation in the refrigerant conduit is operated to produce flow of the refrigerant and cooling of the organ. Conversely, when the true temperature of the organ is equal to or greater than the theoretical temperature, the valve is closed to interrupt the flow of refrigerant through the coil, and the cooling rate of the organ is also interrupted. With this arrangement, the organ is cooled at a predetermined uniform rate, and this method of cooling precludes damage to the organ.

5 Claims, 2 Drawing Figures

PATENTED AUG 6 1974

3,827,251

APPARATUS FOR COOLING A LIVING ORGAN

SUMMARY OF THE INVENTION

This invention relates to an apparatus for cooling and/or freezing living organs (for transplant) and more particularly to an apparatus for cooling a living organ at a controlled predetermined rate to thereby preclude damage to the organ.

It has been found that living organs when cooled to temperatures below 0°C will remain viable for long periods of time and these frozen organs may then be thawed and thereafter transplanted.

However, it has been found that organs, when cooled too rapidly or, at a nonuniform rate, will incur tissue damage. It is therefore a general object of this invention to provide an apparatus which is operable to permit controlled cooling or freezing of a living organ.

Specifically, the present apparatus includes a cooling receptacle provided with a liquid bath in which the organ is placed. Cooling coils connected with a source of refrigerant such as liquid nitrogen cool the liquid bath and a valve driven by a reversible motor controls the flow of refrigerant through the coils. The control device which includes a program mechanism is preset to cool the organ at a predetermined constant rate and this theoretical temperature in the cooling cycle is constantly monitored and indicated on a calibrated temperature scale.

A thermocouple circuit including a pair of thermocouples constantly senses and monitors the internal and external temperatures of the organ and this true (internal and external) temperature of the organ is also constantly and visually indicated on the calibrated temperature scale. When the true temperature of the organ is less than the theoretical temperature, the control device is operable to operate the valve to permit flow of the refrigerant through the coils which causes cooling of the organ. On the other hand, when the true temperature of the organ is equal to or greater than the theoretical temperature, the control device interrupts operation of the valve motor to prevent flow of the refrigerant through the coils which retards the rate of cooling of the organ.

These and other objects and advantages of this invention will more fully appear from the following description made in connection with the accompanying drawings wherein like reference characters refer to the same or similar parts throughout the several views.

DESCRIPTION OF THE PREFERRED EMBODIMENTS OF THE INVENTION

Figures 1, 2:
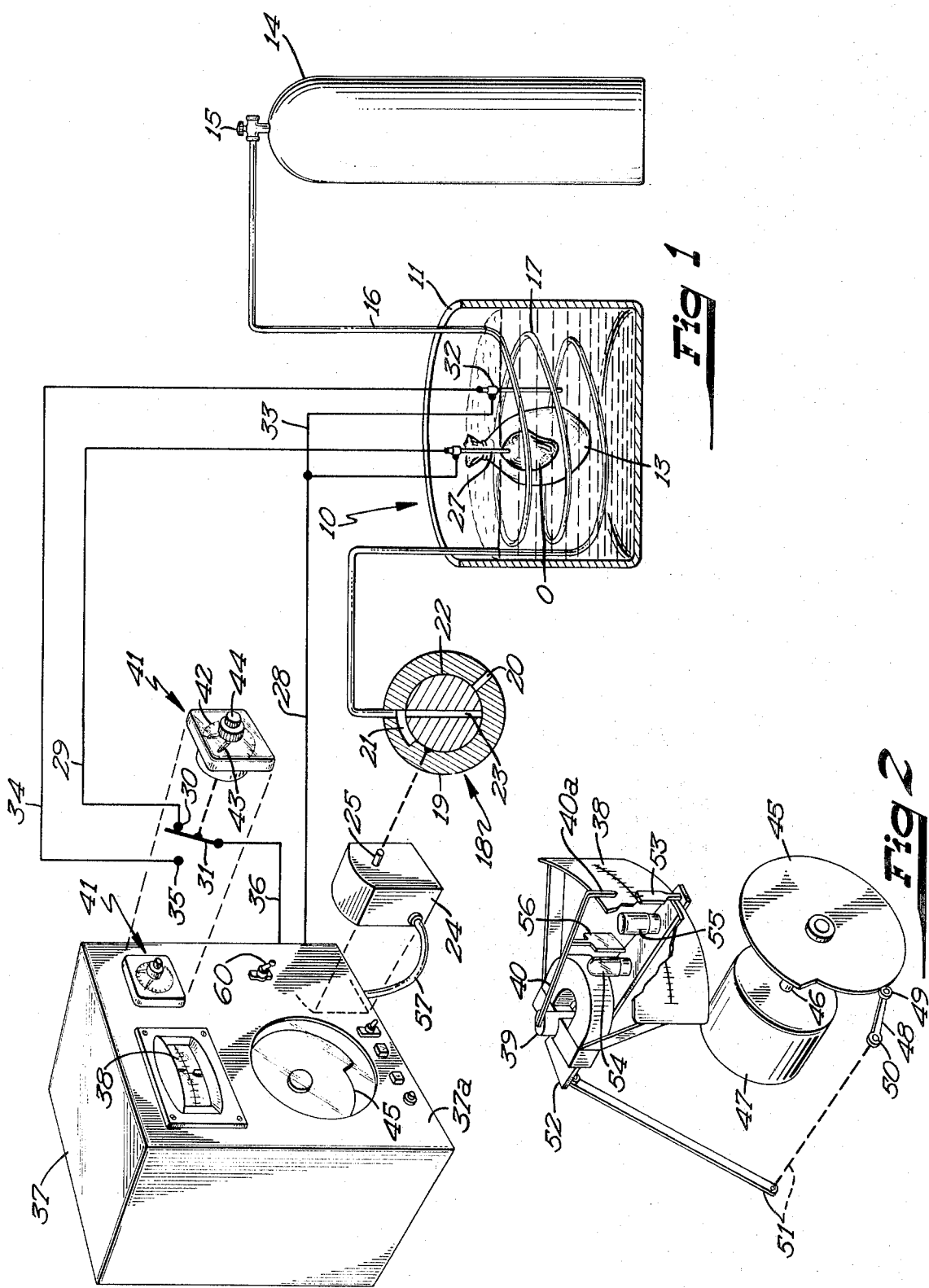
FIG. 1 is a diagrammatic perspective view of the apparatus with certain parts thereof having been exploded and other parts having been illustrated in sections to illustrate the various details thereof.
FIG. 2 is a diagrammatic perspective view of certain components of the control device of the cooling apparatus.

Referring now to the drawings and more specifically to FIG. 1, one embodiment of the novel organ cooling apparatus, designated generally by the reference numeral 10 is there shown. The cooling apparatus 10 includes a receptacle 11 which may be formed of a suitable mettalic material and which is adapted to contain a liquid cooling bath 12. This liquid cooling bath 12 is preferably Dow Hypothermia Liquid or its equivalent which remains in a fluid condition even in extremely low temperatures. A flexible container 13 which will contain the living organ "O" will be suspended or placed within the liquid cooling bath 12 during the freezing or cooling cycle.

The cooling bath and the organ placed therein are cooled by any suitable refrigerant and in the embodiments shown, liquid nitrogen is used. The supply of liquid nitrogen under pressure is contained within a tank 14 which is provided with an outlet valve 15, the latter being connected in flow controlling relation with respect to an elongate conduit 16. The conduit 16 includes a coiled portion 17 which is positioned within the receptacle 11 and immersed in the cooling bath 12. The outlet end of the conduit is connected to a valve 18 comprised of a valve housing 19, the interior of which defines a valve chamber 21. An outlet port 20 intercommunicates the valve chamber 21 with the exterior. A revolvable valve element 22 having a passage 23 therethrough, serves to selectively open and close the valve chamber with respect to the exterior. It will be seen that when valve element 22 is positioned to intercommunicate passage 23, valve chamber 21 and the outlet port 20, liquid nitrogen supplied to the valve will be vented to the exterior. It will be appreciated that the heat exchange action between the refrigerant coils and the bath occurs when the liquid nitrogen is vented to the exterior which in turn permits flow of the liquid nitrogen through the refrigerant coils.

Means are provided for operating the valve 18 and this means comprises a reversible electric servo motor 24 which is provided with an output shaft 25. The output shaft 25 is operatively connected with the valve element 22 and when the reversible motor is driven in a valve opening direction, the valve will be opened to permit flow of the liquid nitrogen through the coils and cooling will occur. Conversely, when the electric motor is driven in the opposite or valve closing direction, the motor will serve to progressively close the valve and eventually interrupt the flow of liquid nitrogen through the cooling coils which retards the rate of cooling.

Means are provided for sensing and monitoring the temperature of the cooling bath 12 and the temperature of the organ 10 and this means comprises a thermocouple circuit 26. The thermocouple circuit 26 includes a first thermocouple 27 which extends into the cavity of the organ to permit sensing of the internal temperature of the organ. One of the metal wires of the thermocouple 27 is connected by an electric conductor 28 to a millivoltmeter which will be described more fully herein below. The other metal wire of the thermocouple 27 is connected by an electrical conductor 29 to one contact 30 of a double throw switch 31.

The thermocouple circuit also includes a second thermocouple 22 which is fixedly mounted on the exterior of the surface of the coiled portion 17 of the conduit 16 and which is immersed in the cooling bath 12. One of the metal wires of the second thermocouple 32 is connected by a conductor 33 to the conductor 28 which as pointed out above, is connected to a millivoltmeter. The other metal wire of the second thermocouple is connected by an electrical conductor 34 to the other contact 35 of the double throw switch 31. Switch 31 is also connected by an electrical conductor 36 to the millivoltmeter.

A housing 37 which contains certain of the components of the thermocouple circuit and other control components is of generally rectangular configuration and has a face 37a which is provided with a calibrated temperature scale 38. The millivoltmeter 39 of the thermocouple circuit is positioned within the housing and is provided with a temperature indicator arm 40. The temperature indicator arm 40 is provided at its outer end with a temperature pointer 41 which moves relative to the temperature scale 38. It will therefore be seen that the voltage generated by changes in temperature at the tips of the thermocouples will be transmitted to the millivoltmeter and will deflect the temperature indicator arm 40 thereby indicating the internal and external temperatures of the organ.

It will be seen that the thermocouple circuit is operable to constantly and alternately sense the external organ temperature by means of thermocouple 32 and the internal temperature of the organ by means thermocouple 27. A timer mechanism in the form of a clock motor 41 is mounted on the housing 37 and the clock motor is provided with a dial having a graduated time scale 42. An indicator pointer 43 is provided and may be adjusted to any preset time by preset adjustable knob 44. The clock motor is connected to the switch 31 and is operable to move the switch arm 31 alternately into contacting relation with the switch contact 30 and the switch contact 35. The clock motor 41 will be preset to determine the duration of time the internal temperature of the organ or the external temperature of the organ will be sensed. It has been found that an interval of approximately 3 seconds duration is satisfactory to sense and accurately indicate the respective internal and external temperatures of the organ.

Means are provided for programming the rate of cooling of the organ in a cooling cycle. This means includes a rotary program cam 45 which may be precut to any preselected time/temperature cooling cycle. The program cam 45 is affixed to an output shaft 46 of an electric motor 47, the latter being provided with suitable speed reduction means such as a gear train or the like. When the motor is energized, the cam 45 will be rotated at a predetermined speed and the periphery of the cam is engaged by a cam follower 48 provided with a cam roller 49 disposed in engaging relation with the edge of the cam. The cam follower 48 is pivotally connected by means of a pivot 50 to one end of a linkage 51. It is pointed out that the linkage 51 is only diagrammatically shown and that the linkage is operatively connected to a program temperature indicator arm 52 also positioned within the housing. The indicator arm 52 is swingable relative to the housing and is provided at its outer end with a pointer 53 that is positioned closely adjacent and forwardly of the temperature scale 38. Therefore, as the cam 45 is rotated, the indicator arm 52 and the pointer 53 will be shifted to indicate the theoretical temperature of the organ during the cooling cycle. It will be appreciated that the pointer 53 which indicates the theoretical temperature in the cooling cycle is movable indenpendently of the pointer 40a which indicates the true temperature of the organ "0."

The indicator arm 52 has a light source 54 mounted thereon for movement therewith. A photoelectric cell 55 is also mounted on the indicator arm 52 but is spaced from the light source 54. Although not shown in the drawing, when light is emitted from the light source 54 and is projected upon the sensitive surfaces of the photoelectric cell 55, electrical current will be generated and will be amplified by suitable amplifying circuits (not shown). These amplifying circuits are connected to the reversible servo motor 24.

During operation of the apparatus, the clock motor will be preset and a cam 45 will be selected for the predetermined time/temperature cooling cycle. In this regard, it has been found that 3°C/minute drop in temperature of the organ permits cooling of the organ at a substantially uniform rate without damaging the organ even when the lower temperatures are achieved. Therefore, for example, the cam 45 may be cut so that the cooling time temperature cycle will permit the organ to be cooled approximately 3°C/minute to a temperature of −36°C.

The clock motor 41 will also be set so that the voltage and temperature generated by each thermocouple will be sensed and indicated for a time duration of 3 seconds. The various circuits of the apparatus may be energized by closing a master switch 60. It will be appreciated that a circuitry for the apparatus may be connected to a conventional electrical outlet for the supply of current needed in its operation. Liquid nitrogen will flow through the conduit 16 and then vented to the exterior during heat exchange cooling action which cools the bath and the organ. The clock motor will operate continuously thereby causing the external temperature and the internal temperature of the organ to be sensed and indicated. During the cooling cycle, the external temperature of the organ will be slightly lower than the internal temperature of the organ so that the pointer 40a will be deflected slightly each time the clock motor 41 shifts the switch arm 31.

The motor 47 will drive the rotary cam 45 and this movement will be transmitted by the linkage to the indicator arm 52 and the pointer 53. Thus the theoretical temperature in the preselected cooling cycle will be constantly indicated and the internal and external temperature of the organ will also be constantly sensed and indicated.

The indicator arm 40a is provided with a depending opaque flag 56 which moves with the arm. The flag 56 is actually translucent adjacent its lateral periphery and becomes increasingly opaque towards the center thereof. Therefore, if the center portion of the flag is positioned to interrupt the light beam to the photoelectric cell, the light beam will be eclipsed completely. However, if the lateral peripheral portions of the opaque flag obstruct the light beam, some light will be passed through the flag but the current output by the photoelectric cell will be reduced.

It will be seen that when the opaque flag is disposed out of obstructing relation with respect to the light source, current will be produced to operate the valve motor 24. When the temperature indicator arm 40 indicates the true temperature of the organ to be less than the theoretical temperature, the valve motor will open the valve thereby permitting the flow of refrigerant through the coils which results in cooling of the organ. However, when the temperature indicator arm 40 is deflected in response to a reduction in temperature so that the flag 56 begins to interrupt the light beam to the photoelectric cell, the current will be reduced until the light is completely eclipsed with respect to the photo cell. In the event that the current is interrupted or reduced, and is thereafter increased, a relay within the servo motor 24 will reverse the direction of the motor and progressively move the valve 19 to the open position thereby increasing the cooling rate of the organ. The motor is also provided with a potentiometer to permit selection of the point of reversal of the motor. The valve motor 24 is preferably the type M80BAA or a type M80BAD manufactured by Penn Controls Inc. This motor is a split-phase, capacitor-type in which the output shaft is operated through precision gears. The output shaft also actuates cam operated switches which stop the shaft rotation at predetermined limits of travel. As pointed out above, the motor is proportional with a balance relay and may have one or two potentiometers.

The organ will be cooled in the cooling cycle until it reaches the preselected temperature and the organ may then be removed from the receptacle and placed in a suitable environment where a preselected temperature is maintained.

From the foregoing description, it will be seen that we have provided an apparatus which is operable to cool and/or freeze a living organ in a predetermined uniformed way and thereby preclude any damage to the organ. Thus, it will be seen that the novel organ cooling apparatus is more efficient than any heretofore known comparable apparatus.

What is claimed is:

1. Apparatus for controlled cooling of a living organ, comprising;

a receptacle containing a cooling liquid;

an elongate conduit connected to a source of refrigerant and including a coiled portion positioned within said receptacle, a valve connected in communicating relation with said conduit and being operable to open and close the flow of refrigerant through said conduit, said valve when in the open position allowing the flow of refrigerant through said conduit and to cause cooling of the organ, said valve when in the closed condition interrupting the flow of refrigerant through the conduit and thereby retarding cooling of the organ, a motor operatively connected with said valve and being operable to open and close the valve, a thermocouple circuit including a pair of thermocouples one of which engages and senses the internal temperature of the organ and the other thermocouple sensing the external temperature of the organ, a signal receiving mechanism receiving electrical signals from said thermocouples, a calibrated temperature scale including a first pointer arm connected with said signal receiving mechanism and being deflected in response to signals received by the signal receiving mechanism from the thermocouple to indicate the internal and external temperature of the organ on the calibrated temperature scale, a switch in said thermocouple circuit, an adjustable timer mechanism operatively connected with said switch and being operable to alternately interrelate each thermocouple for a predetermined time with the signal receiving mechanism, a mechanical program device including means defining a second pointer arm adjacent said calibrated temperature scale, said program device being operable to shift said second pointer arm in a temperature reducing direction at a preselected rate to continuously indicate the theoretical temperature of the organ in a predetermined cooling cycle, said program device including current generating means interconnected with said valve motor and generating current to operate the valve motor to thereby open the valve when the internal and external temperatures of the organ are less than the theoretical temperature of the organ, said program device being operable to progressively reduce the current to the valve motor as the external and internal temperatures approach the theoretical temperature of the organ.

2. The apparatus as defined in claim 1 wherein said timer mechanism comprises a clock motor.

3. The apparatus as defined in claim 1 wherein said valve is connected to said conduit downstream from said coil portion, and when opened, venting the refrigerant to the exterior.

4. The apparatus as defined in claim 1 wherein one of said thermocouples is immersed in the cooling liquid and the other thermocouple is positioned interiorly of the organ to be cooled.

5. The apparatus as defined in claim 1 wherein said program device includes a rotary cam, a cam follower engaging said cam and connected with said second pointer arm to thereby cause shifting movement of said second pointer in response to rotary movement of the cam.

* * * * *